United States Patent [19]

Kiya et al.

[11] Patent Number: 4,751,652

[45] Date of Patent: Jun. 14, 1988

[54] NUMERICAL CONTROL DRILLING RESTART CONTROL SYSTEM

[75] Inventors: Nobuyuki Kiya, Hachioji; Motoaki Yoshino, Hino, both of Japan

[73] Assignee: Fanuc Ltd., Minamitsuru, Japan

[21] Appl. No.: 94,080

[22] Filed: Sep. 8, 1987

Related U.S. Application Data

[63] Continuation of Ser. No. 882,210, Jul. 3, 1986, abandoned, which is a continuation of Ser. No. 576,879, Feb. 3, 1984, abandoned.

[30] Foreign Application Priority Data

Feb. 3, 1983 [JP] Japan .................. 58-16749

[51] Int. Cl.$^4$ ....................... G06F 15/46; G05B 19/18
[52] U.S. Cl. .................................. 364/474; 318/563; 364/184
[58] Field of Search ................. 364/167–171, 364/184–187, 474, 475; 318/563–565, 567–569

[56] References Cited

U.S. PATENT DOCUMENTS

| | | | |
|---|---|---|---|
| 4,370,705 | 1/1983 | Imazeki et al. ............... | 364/167 X |
| 4,376,970 | 3/1983 | Ilseman et al. ............... | 364/167 |
| 4,442,493 | 4/1984 | Wakai et al. ................. | 364/475 |
| 4,484,287 | 11/1984 | Gamo et al. .................. | 364/474 |
| 4,513,380 | 4/1985 | Spooner ....................... | 364/474 |
| 4,531,182 | 7/1985 | Hyatt .......................... | 364/167 X |
| 4,534,001 | 8/1985 | Nozawa et al. ............... | 364/474 |

Primary Examiner—Joseph Ruggiero
Attorney, Agent, or Firm—Staas & Halsey

[57] ABSTRACT

A machining end detecting device detects whether each hole or the like has completely been drilled to its bottom or not, and the latest drilling information is stored in a nonvolatile memory. In the nonvolatile memory are also stored modal data sequence numbers assigned to drilling start position determining blocks and the latest information on a drilling restart position. Upon inputting a drilling restart command from key input means such as a cycle start button, a restart block indexing device indexes, from a numerical control machining program, a restart block necessary for resuming drilling of an unfinished hole or the like on the basis of the sequence numbers and the machining end detection information stored in the nonvolatile memory. A restart positioning device positions a drilling machine at the drilling start position stored in the nonvolatile memory, and a control device causes the drilling machine to restart with the indexed restart block from the specified position.

6 Claims, 5 Drawing Sheets

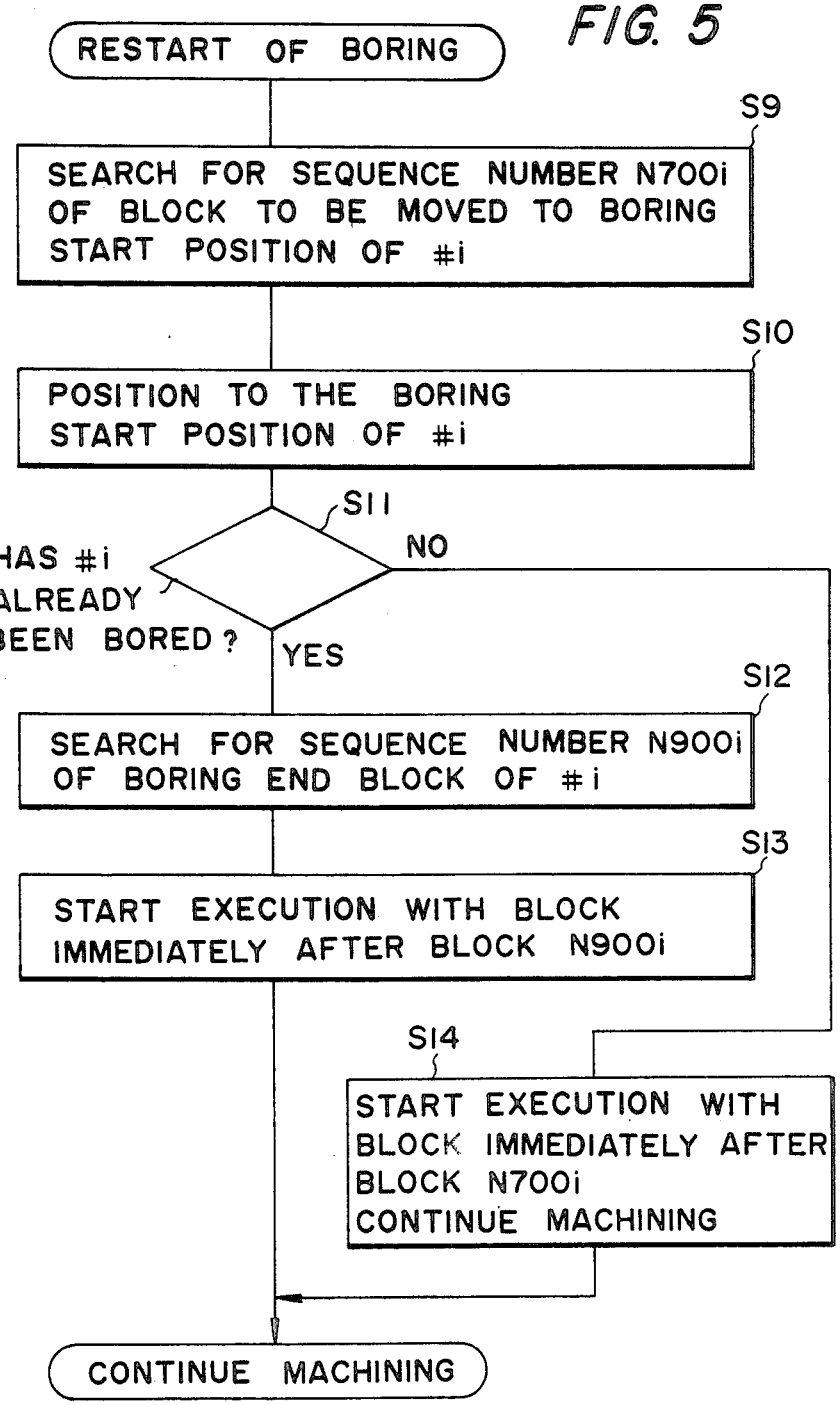

NUMERICAL CONTROL DRILLING RESTART CONTROL SYSTEM

This is a continuation of co-pending application Ser. No. 882,210, filed on July 3, 1986, now abandoned, which is a continuation of Ser. No. 576,879, filed Feb. 3, 1984, now abandoned.

BACKGROUND OF THE INVENTION

1. Field of the Invention

The present invention relates to a numerical control (NC) machining restart control system which when supplied with a machining restart command, automatically restarts numerically-controlled drilling of holes or the like which have been interrupted by something such as an electric power failure or a stop operation.

2. Description of the Prior Art

When drilling many holes or pockets (hereinafter referred to as holes or the like) in a workpiece through the use of a numerically-controlled machine tool, if the drilling operation is discontinued by some cause during drilling an arbitrary hole, it is customary in the prior art, when restarting the drilling operation, to re-execute an NC machining program from the very beginning, or to return the operation, by an operator's manipulation, to the block which was being executed when the drilling operation was interrupted and to restore various modal data for determining machining conditions. The modal data herein mentioned is one that, when contained in a block, is effective not only for that block but also for the subsequent ones until a cancel command is issued. The former method inevitably involves blank drilling of finished holes or the like, and hence waste much time, whereas the latter method involves a manual operation and often encounters difficulty in complete restoration of the modal data due to an erroneous manipulation.

SUMMARY OF THE INVENTION

It is therefore an object of the present invention to provide an NC machining restart control system which ensures correct restarting of numerically-controlled hole drilling or the like without undue dead time and under the same conditions as those before the drilling operation was discontinued.

According to the present invention, as shown in FIG. 1, drilling or machining end detecting means DET detects whether each hole or the like has been completely drilled to its bottom or not, and the latest detection result or data is stored in a nonvolatile memory MEM. In the nonvolatile memory MEM are further stored modal data, sequence numbers assigned to drilling start position determining blocks and the latest information or data on the drilling start position. When supplied with a drilling restart command from key input means MDI, such as a cycle start button or the like, restart block indexing means BDT indexes to, in an NC machining program, a restart block necessary for restarting the drilling operation of an unfinished hole or the like, on the basis of the sequence numbers and the drilling end detection information stored in the nonvolatile memory MEM. Restart positioning means PST positions a drilling machine at a position stored in the nonvolatile memory MEM, and control means CNT causes the drilling machine to restart with the indexed restart block from the specified position.

BRIEF DESCRIPTION OF THE DRAWINGS

FIGS. 3 and 5 are flowcharts, each showing an example of the software arrangement of the system embodying the present invention.

DESCRIPTION OF THE PREFERRED EMBODIMENTS

Figure 1:
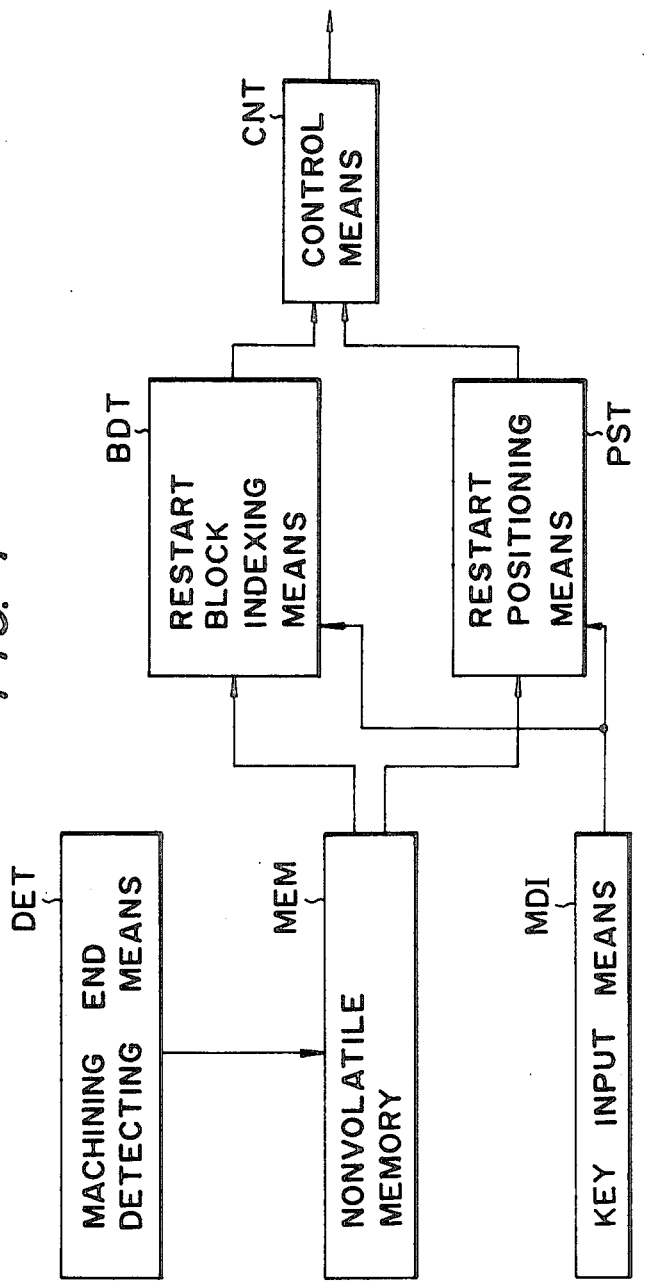
FIG. 1 is a block diagram illustrating the arrangement of the NC machining restart control system of the present invention.
Figure 2:
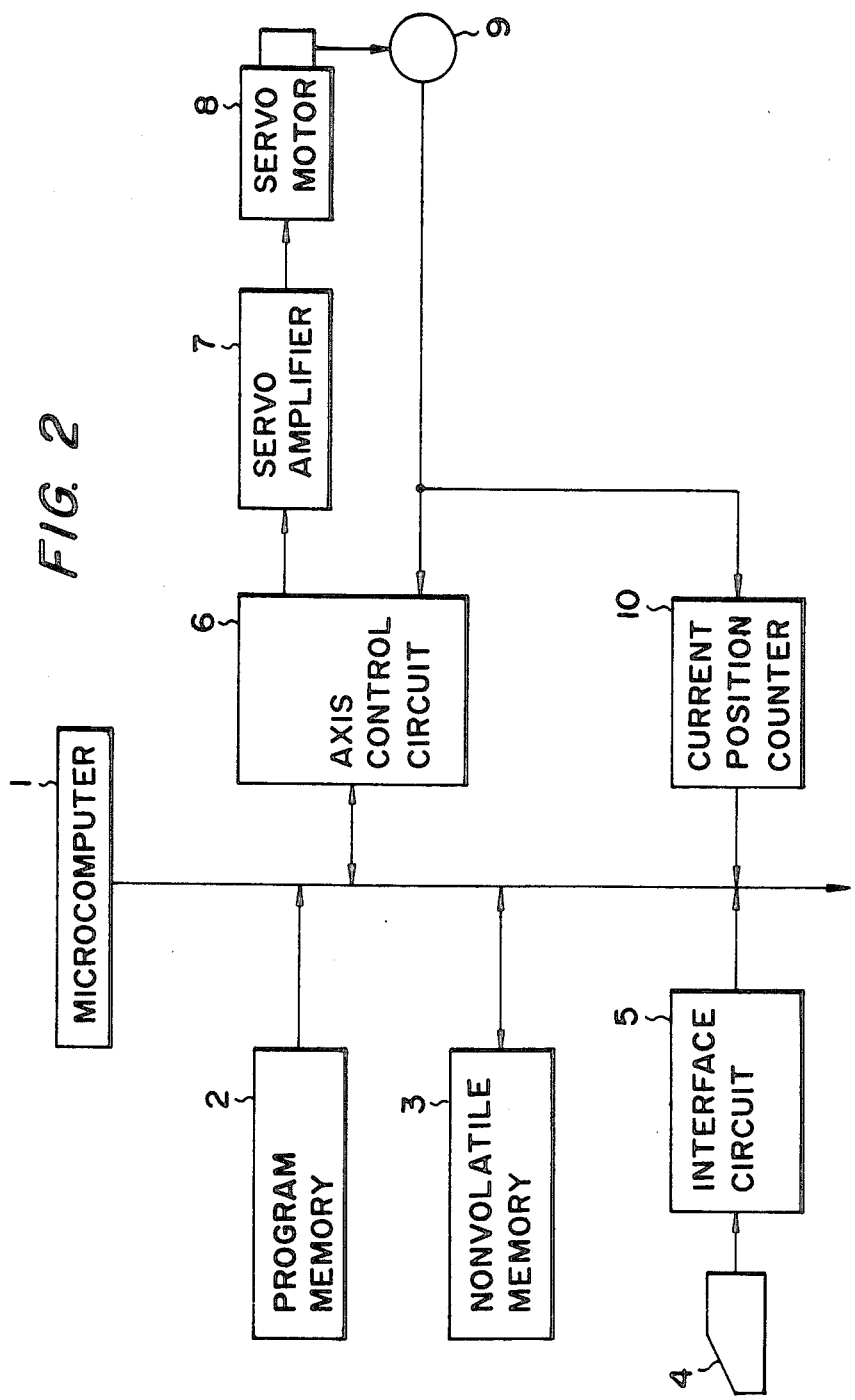
FIG. 2 is a block diagram illustrating, by way of example, the hardware arrangement of an embodiment of the present invention.

In FIG. 2, reference numeral 1 indicates a microcomputer; 2 designates a program memory for storing an NC machining program, which memory may also be formed by a command tape and a tape reader; 3 identifies a read/write nonvolatile memory; 4 denotes a manual data input device; 5 represents its interface circuit; 6 shows an axis control circuit; 7 refers to a servo amplifier; 8 signifies a servo motor; 9 indicates a position sensor; and 10 designates a current position counter. For convenience of description, the axis control circuit 6, the servo amplifier 7, the servo motor 8, the position sensor 9 and the current value counter 10 are each shown with only one axis portion thereof.

Figure 3:
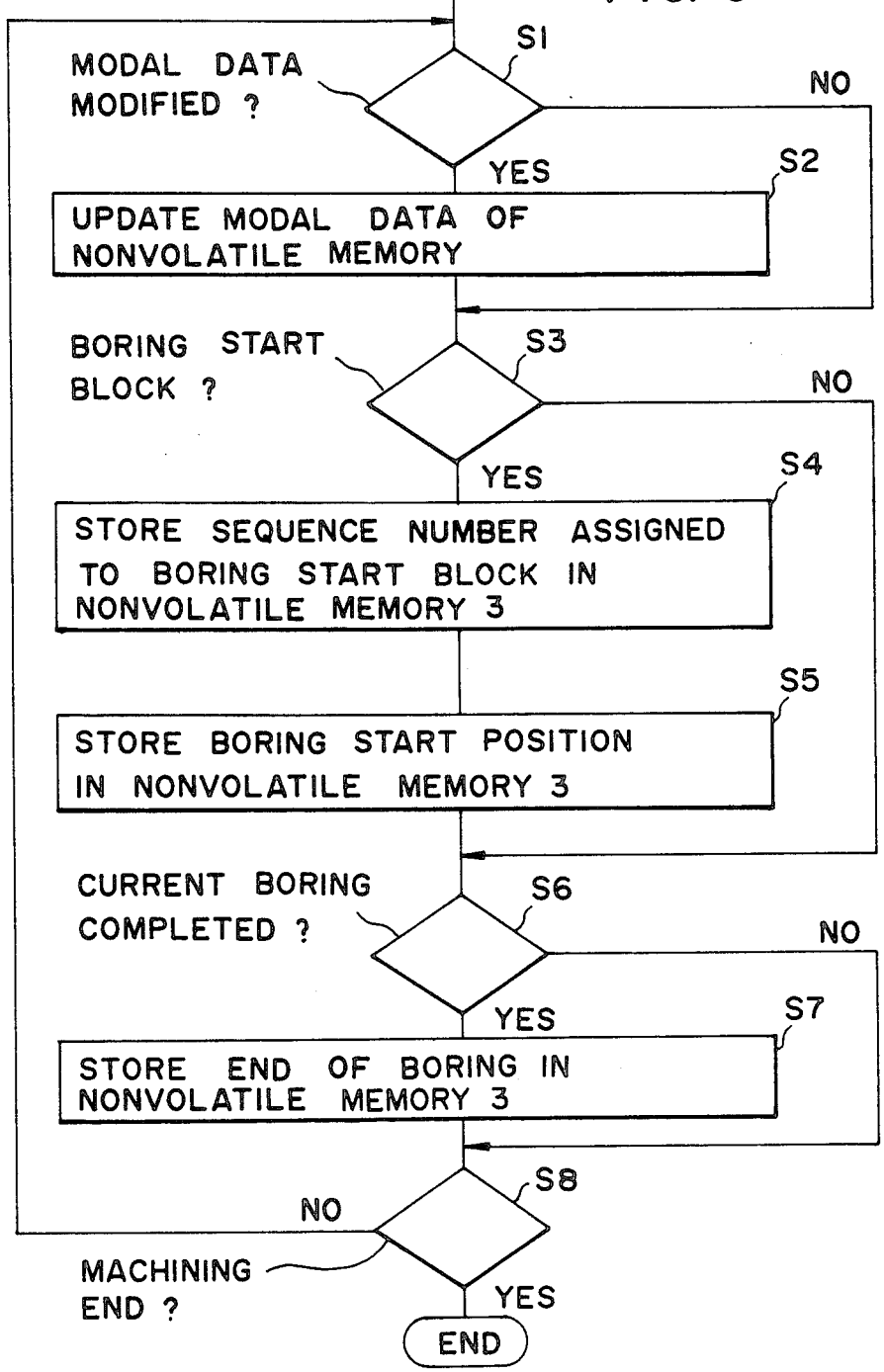

The microcomputer 1 reads and interprets, block by block, the NC machining program stored in the program memory 2, and controls the axis control circuit 6 in a known manner to drive the servo motor 9 via the servo amplifier 7, executing predetermined NC machining, while at the same time performing the processing shown in FIG. 3.

That is, when modal data is being modified during execution of the NC machining program, the microcomputer 1 rewrites stored information in a modal information storage area of the nonvolatile memory 3, so that modal data for the current machining operation is always held in the nonvolatile memory 3 (steps S1 and S2). In conventional numerical controllers, too, since modal data on the current machining operation is generally stored in a memory or the like, the above-described process can be achieved by writing the contents of the memory or the like into the non-volatile memory 3. Of course, the above described memory or the like may also be formed using a nonvolatile memory or the like. Further, it is also possible to store the latest modal data for each execution of a drilling start position determining block described later.

Figure 4:
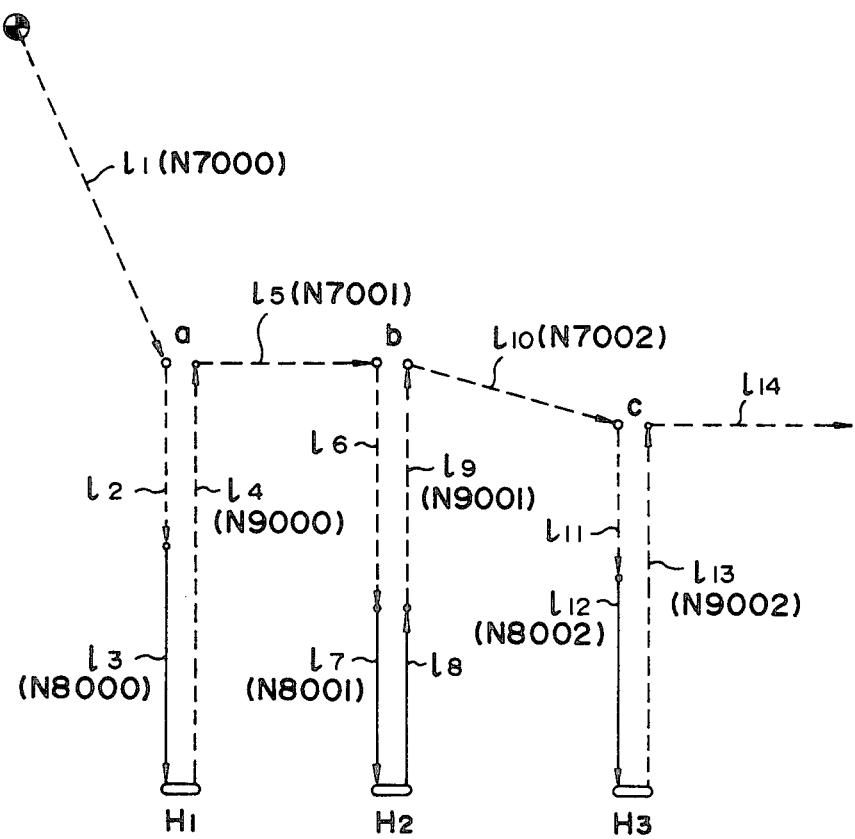
FIG. 4 is a schematic diagram showing the path of a tool in an example of drilling according to the present invention.

The microcomputer 1 checks whether the block to be executed is the drilling start position determining block (step S3). This checking is effected by preassigning specific sequence numbers, for example, N7000 to N7999, to drilling the start position determining blocks and identifying these sequence numbers. For instance, when moving a tool along segments $l_1$ to $l_{14}$ for drilling three holes $H_1$ to $H_3$ as shown in FIG. 4, those blocks corresponding to the segments which correspond to drilling start position determining blocks, that is, blocks corresponding to the segments $l_1$, $l_5$ and $l_{10}$ in this example, are preassigned sequence numbers N7000, N7001 and N7002, respectively. After deciding that the block to be executed is a drilling start position determining block, the microcomputer 1 stores its sequence number in a sequence number storage area of the nonvolatile memory 3, or updates the contents stored therein previously. At the same time, it detects drilling start positions (a to c), that is, end positions of drilling start position determining blocks and stores the detected positions in drilling start position storage area of the nonvolatile memory 3, or updates the contents stored therein previously (steps S4 and S5). Since the end position of each drilling start position determining block is already known at the stage of interpreting the block, the drilling start position can be stored immediately before executing the drilling start position determining block that is, before positioning the machine tool. Incidentally, in the embodiment shown in FIG. 2, the position of the drilling machine is detected by reading out the contents of the current position counter 10 which counts up and down based on output pulses from the position sensor 9.

Next, the microcomputer 1 checks whether the current drilling of a hole has been completed, that is, whether the hole has been completely drilled to its bottom as predetermined (step S6). This checking is effected in the following manner: Specific sequence numbers, for instance, N8000 to N8999, are preassigned to blocks related to bottoming, and it is checked to determine whether the execution of a concerned one of such blocks has been completed. Alternatively, specific sequence numbers are each preassigned to a block for bringing the tool from the bottom of the hole to a drilling end position (i.e., a retraction block), and it is determined whether the execution of this block has been started. In the example shown in FIG. 4, sequence numbers, such as N8000, N8001 and N8002, are preassigned to blocks corresponding to the segments $l_3$, $l_7$ and $l_{12}$ (which blocks are related to bottoming), or specific sequence numbers are preassigned to blocks (for bringing the tool up from the bottom of the hole to a drilling end position) corresponding to the segments $l_4$, $l_8$ and $l_{13}$. Incidentally, when performing the drilling operation using a one-block command in a a fixed repeated cycle, the above-described numbering of blocks is not necessary because it is known from the state of execution of the fixed cycle whether the hole has been completed. When the drilling of the hole currently being executed has been completed, this information is stored in a drilling process storage area of the nonvolatile memory 3 (step S7).

The above-described process is carried out continuously during drilling (step S8). Accordingly, when drilling is interrupted by some cause, for example, a power failure, the nonvolatile memory 3 stores modal data at that time, or at the time of execution of the drilling start position determining block immediately preceding it, the sequence number of the drilling start position determining block which has been completely executed or was to be executed immediately before the interruption, the drilling start position and the information on the presence or absence of a finished hole or holes. The following table shows, by way of example, the contents of the nonvolatile memory 3 in cases of interrupting machining when the tool is moving along each of the segments $l_1$ to $l_{14}$.

| State of tool at the time of interruption | Contents of nonvolatile memory | | | |
|---|---|---|---|---|
| | Modal data | Sequence number of drilling start position determining block | Drilling start position | Information on finished hole |
| Moving along segment $l_1$ | modal data during moving along $l_1$ | N7000 | a | — |
| Moving along segment $l_2$ | modal data during moving along $l_2$ | N7000 | a | — |
| Moving along segment $l_3$ | modal data during moving along $l_3$ | N7000 | a | — |
| Moving along segment $l_4$ | modal data during moving along $l_4$ | N7000 | a | H1 finished |
| Moving along segment $l_5$ | modal data during moving along $l_5$ | N7001 | b | H1 finished |
| Moving along segment $l_6$ | modal data during moving along $l_6$ | N7001 | b | H1 finished |
| Moving along segment $l_7$ | modal data during moving along $l_7$ | N7001 | b | H1 finished |
| Moving along segment $l_8$ | modal data during moving along $l_8$ | N7001 | b | H2 finished |
| Moving along segment $l_9$ | modal data during moving along $l_9$ | N7001 | b | H2 finished |
| Moving along segment $l_{10}$ | modal data during moving along $l_{10}$ | N7002 | c | H2 finished |
| Moving along segment $l_{11}$ | modal data during moving along $l_{11}$ | N7002 | c | H2 finished |
| Moving along segment $l_{12}$ | modal data during moving along $l_{12}$ | N7002 | c | H2 finished |
| Moving along segment $l_{13}$ | modal data during moving along $l_{13}$ | N7002 | c | H3 finished |
| Moving along Segment $l_{14}$ | modal data during moving along $l_{14}$ | N7002 | c | H3 finished |

After returning the tool to its initial position by a proper method, when depressing a cycle start button provided on the side of the drilling machine or activating separately provided key input means to restart drilling, the microcomputer 1 indexes, based the stored information of the nonvolatile memory 3, to the block with which the drilling operation is to restart. The restart block is indexed in such a manner that where the drilling operation is interrupted during drilling an arbitrary ith hole, if the hole has been drilled to its bottom, then the hole is regarded as finished and the drilling operation restarts with the next (i+1)th hole, and if the ith hole has not been drilled to the bottom, the drilling operation restarts with the ith hole. For example, when the drilling operation is interrupted in the section of the segments $l_5$, $l_6$ and $l_7$ in FIG. 4, a block corresponding to the segment $l_6$ is indexed to, and when the drilling operation is interrupted in the section of segments $l_8$ to $l_9$, a block corresponding to the segment $l_{10}$ is indexed to as the restart block. To enable this indexing, drilling start position restoring blocks corresponding to the segments $l_4$, $l_9$, $l_{13}$ and so on are preassigned specific numbers, for example, N9000 to N9999. When using a fixed cycle, the block immediately after the fixed cycle is indexed.

Further, the microcomputer 1 indexes, based on the contents of the nonvolatile memory 3, to the position of the drilling machine for starting the drilling operation immediately before interruption of the drilling operation, and positions the tool at that position. For instance, when the drilling operation was interrupted as the tool was moving along the segments $l_5$ to $l_{10}$, the microcomputer 1 reads out the a position of the drilling machine immediately before execution of the drilling start block corresponding to the segment $l_6$. Then the microcomputer 1 reads out the indexed restart block from the program memory 2 and restarts the drilling operation under the same conditions as those when the drilling operation was discontinued. Incidentally, since the drilling start position, for example, the start point of the segment $l_6$ and the drilling end position, for example, the end point of the segment $l_9$, are usually identical, the tool is positioned at the same position regardless of whether drilling at that point has been completed or not.

FIG. 5 is a flowchart illustrating an example of software for implementing the above-described drilling restart function when the drilling operation is restarted after being interrupted during drilling the ith hole #i. The sequence number N700i of a block for bringing the tool to the position at which to start drilling of the ith hole #i is searched for in the nonvolatile memory 3 (S9), and the drilling start position of the hole #i is read out from the nonvolatile memory 3 for positioning the tool (S10). It is determined from the contents of the nonvolatile memory 3 whether the hole #i has been finished or not (S11). If unfinished, the drilling operation is started with the block immediately after the block N700i (S14) and, if finished, the sequence number N900i of a drilling end block of the hole #i is searched for (S12), and the drilling is started with the block immediately after the block of the sequence number N900i (S13).

As has been described in the above, the present invention performs the drilling operation while storing in the nonvolatile memory the information with which it is possible if the drilling operation, is interrupted that it can be restarted under the same conditions as those at the time of interruption and from the position which the tool assumed immediately before the drilling operation was interrupted. Accordingly, even if the drilling operation is interrupted by a power failure or some other cause, the drilling machine can quickly be restored to its previous state for restarting the drilling operation, by only inputting a drilling restart command.

It will be apparent that many modifications and variations may be effected without departing from the scope of the novel concepts of the present invention.

What is claimed is:

1. A numerical control (NC) hole drilling restart control system, responsive to a drilling interruption of a drilling tool at an interrupt position, for drilling a plurality of holes in a workpiece in accordance with a command in an NC machining program, said drilling end detecting means for detecting whether each drilled hole has been completed and producing drilling end detection information;

a nonvolatile memory for storing modal data, sequence numbers assigned to drilling start position determining blocks for each hole, a drilling start position for each hole, and related to the detection result produced by the drilling end detecting means, and the corresponding sequence numbers designating a restart position block, the restart position block being a beginning of a current block when drilling is interrupted prior to completion of the hole according to the current block, and at a beginning of a successive block when drilling is interrupted after completion of the hole corresponding to the current block;

key input means for inputting a drilling restart command;

restart block indexing means, responsive to the drilling restart command, for indexing to the restart position block corresponding to the drilling restart position necessary for restarting drilling of an unfinished hole on the basis of the sequence numbers and the drilling end detection information stored in the nonvolatile memory;

restart positioning means, responsive to the drilling restart command, for positioning a drilling machine at the drilling restart start position stored in the nonvolatile memory; and control means for causing the drilling operation to automatically restart with the indexed restart position block after positioning of the drilling machine.

2. An NC machining restart control system responsive to a machining interruption of a machine tool at an interrupt position, said system comprising:

positioning means for moving the machine tool and detecting a current position of the machine tool;

program means for storing a numerical control machining program divided into blocks where each block performs a machining task;

data means for storing modal information for a current block currently being performed and for storing block restart data indicating a restart position in dependence upon the current position and the block currently being performed, the restart position being the beginning of the current block when a machining interruption occurs prior to completion of the machining operation, corresponding to the current block and the beginning of a successive block when the interruption occurs after completion of the machining corresponding to the current block;

control means, operatively connected to said positioning means, said program means and said data means, for controlling said positioning means to machine with the machine tool in dependence upon the numerical control machining program, for storing, into said data means, at the beginning of the execution of a current block, the modal information for the current block, for storing into said data means block restart data including the restart position block, which is the beginning of the successive block, when a block is completed and for automatically restarting machining responsive to the machining interruption at the restart position in dependence upon the block restart data.

3. A system as recited in claim 2, wherein said block restart data includes an indicator for a start position determining block and machining is restarted using the last completed start position determining block.

4. A system as recited in claim 2, wherein said data means is a nonvolatile memory.

5. An NC machining restart control method, comprising the steps of:

storing modal data and start position data for a current machining block of a numerical control program during machining based on the current machining block;

storing block restart data when a block is completed; and restarting machining automatically at a restart position in dependence upon the modal data, the start position data and the block restart data when machining is interrupted, where the restart position is the beginning of the current machining block when machining is interrupted prior to completion of the current block, and a beginning of a successive block when machining is interrupted after machining of the current block is completed.

6. A method as recited in claim 5, wherein said block restart data includes a start position determining block indicator and machining is restarted using the last completed start position determining block.

* * * * *

UNITED STATES PATENT AND TRADEMARK OFFICE
CERTIFICATE OF CORRECTION

PATENT NO. : 4,751,652

DATED : June 14, 1988

INVENTOR(S) : Nobuyuki Kiya, Motoaki Yoshino

It is certified that error appears in the above-identified patent and that said Letters Patent is hereby corrected as shown below:

Col. 4, line 50, "of" should be --in--.

Col. 5, line 8, delete "a";

line 59, after "said" insert --system comprising:--.

Signed and Sealed this

Twenty-second Day of November, 1988

Attest:

DONALD J. QUIGG

*Attesting Officer*       *Commissioner of Patents and Trademarks*